United States Patent
Totsch et al.

(10) Patent No.: US 10,924,685 B2
(45) Date of Patent: Feb. 16, 2021

(54) NIGHT VISION APPARATUS

(71) Applicant: Rubicon Products, LLC, Cedar Hill, MO (US)

(72) Inventors: John Totsch, Cedar Hill, MO (US); Kevin Dougherty, Key Biscayne, FL (US)

(73) Assignee: Rubicon Products, LLC, Cedar Hill, MO (US)

(*) Notice: Subject to any disclaimer, the term of this patent is extended or adjusted under 35 U.S.C. 154(b) by 0 days.

(21) Appl. No.: 15/972,947

(22) Filed: May 7, 2018

(65) Prior Publication Data

US 2019/0342482 A1    Nov. 7, 2019

(51) Int. Cl.
| | |
|---|---|
| *H04N 5/235* | (2006.01) |
| *H04N 7/18* | (2006.01) |
| *H04N 5/30* | (2006.01) |
| *H04N 9/04* | (2006.01) |
| *F21S 41/13* | (2018.01) |

(52) U.S. Cl.
CPC ............. *H04N 5/2354* (2013.01); *H04N 5/30* (2013.01); *H04N 7/183* (2013.01); *H04N 9/045* (2013.01); *B60R 2300/101* (2013.01); *B60R 2300/106* (2013.01); *F21S 41/13* (2018.01)

(58) Field of Classification Search
None
See application file for complete search history.

(56) References Cited

U.S. PATENT DOCUMENTS

| | | |
|---|---|---|
| 5,396,069 A | 3/1995 | Craig et al. |
| 5,444,568 A | 8/1995 | Williams, Jr. et al. |
| 5,495,364 A | 2/1996 | Palmer |
| 5,729,016 A * | 3/1998 | Klapper .................. B60R 1/00 250/332 |
| 5,737,131 A | 4/1998 | Palmer |

(Continued)

FOREIGN PATENT DOCUMENTS

CN    201619679 U    11/2010

OTHER PUBLICATIONS

International Search Report dated Sep. 18, 2019 (issued in PCT Application No. PCT/US2019/040469) [3 pages].

(Continued)

*Primary Examiner* — Chikaodili E Anyikire
(74) *Attorney, Agent, or Firm* — Amatong McCoy LLC

(57) ABSTRACT

A night vision apparatus having a camera assembly with a camera housing that has a charge-coupled device image sensor, an infrared illuminator assembly, and a first base assembly. Further having a switch assembly and a display assembly. The camera housing has a top face, a bottom face, a front face, a lens, and an adaptor. The lens has a focal length of approximately 25 mm or 50 mm. The infrared illuminator assembly has a housing, an infrared illuminator lens, an infrared illuminator, and a supporting structure. The infrared illuminator is an approximately 2.5 watt illuminator that produces an approximately 10° main beam pattern. The infrared illuminator assembly is attached to the camera housing. The first base assembly has a suction cup secures the camera assembly onto a surface. The switch assembly is electrically connected to a battery assembly. The display receives and shows images captured by the camera assembly.

20 Claims, 5 Drawing Sheets

(56) References Cited

U.S. PATENT DOCUMENTS

| | | | |
|---|---|---|---|
| 5,751,344 A * | 5/1998 | Schnee | B63B 45/02 |
| | | | 348/113 |
| 5,763,882 A | 6/1998 | Klapper et al. | |
| 6,057,880 A | 5/2000 | Schnee | |
| 7,106,359 B2 * | 9/2006 | Fantone | A01K 97/00 |
| | | | 348/81 |
| 7,349,804 B2 * | 3/2008 | Belenkii | G01C 21/025 |
| | | | 701/500 |
| 7,581,852 B2 | 9/2009 | Kennedy et al. | |
| 7,679,530 B2 * | 3/2010 | Waquet | G01S 17/93 |
| | | | 340/903 |
| 8,076,633 B2 | 12/2011 | Shimizu | |
| 8,384,780 B1 | 2/2013 | Frank et al. | |
| 8,463,038 B2 | 6/2013 | Sakai et al. | |
| 8,502,913 B2 | 8/2013 | Nakayama | |
| 9,117,139 B2 | 8/2015 | Nakayama | |
| 9,615,006 B2 * | 4/2017 | Terre | G08B 13/1963 |
| 9,729,802 B2 | 8/2017 | Frank et al. | |
| 10,326,921 B2 * | 6/2019 | Chien | H04N 5/2256 |
| 2002/0067413 A1 * | 6/2002 | McNamara | H04N 5/2352 |
| | | | 348/216.1 |
| 2002/0184640 A1 * | 12/2002 | Schnee | H04N 7/181 |
| | | | 725/105 |
| 2003/0093805 A1 * | 5/2003 | Gin | G08B 13/19619 |
| | | | 725/105 |
| 2006/0238617 A1 * | 10/2006 | Tamir | G08B 13/19606 |
| | | | 348/143 |
| 2011/0199482 A1 * | 8/2011 | Morgan | H04N 5/2251 |
| | | | 348/143 |
| 2014/0043478 A1 * | 2/2014 | Burton | H04N 5/2254 |
| | | | 348/143 |
| 2015/0369565 A1 * | 12/2015 | Kepler | F41G 1/38 |
| | | | 348/143 |
| 2016/0214534 A1 * | 7/2016 | Richards | G01S 13/867 |

OTHER PUBLICATIONS

Written Opinion dated Sep. 18, 2019 (issued in PCT Application No. PCT/US2019/040469) [5 pages].

* cited by examiner

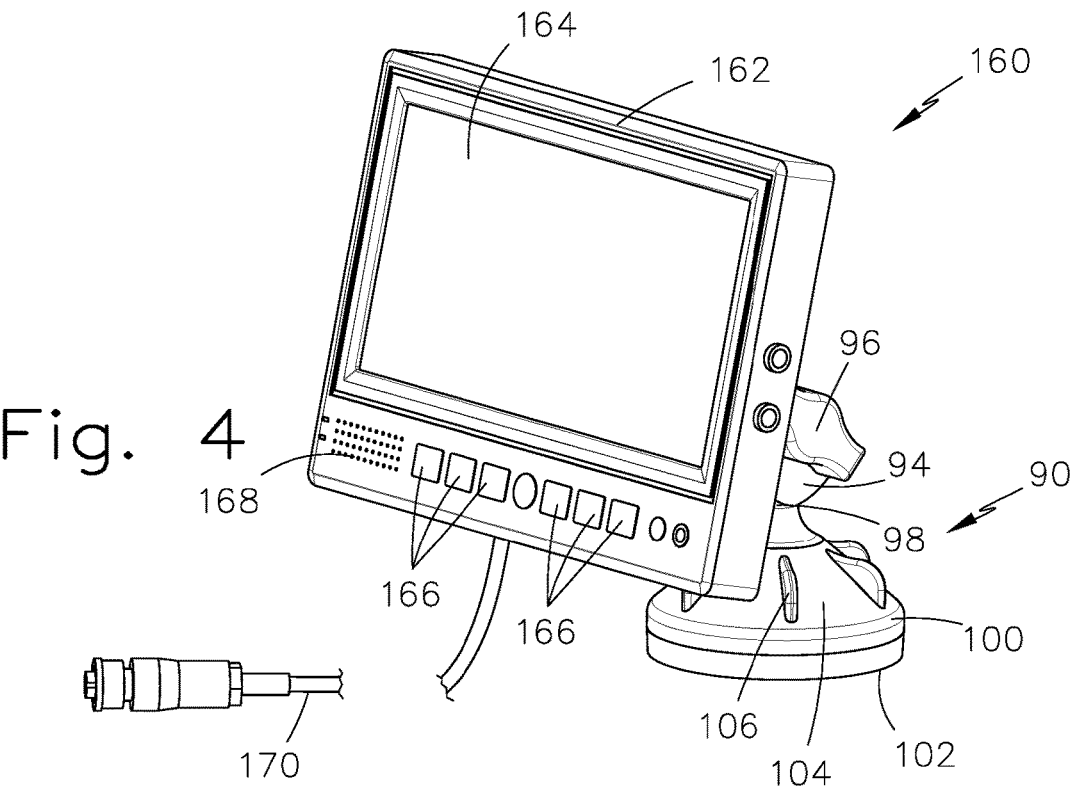
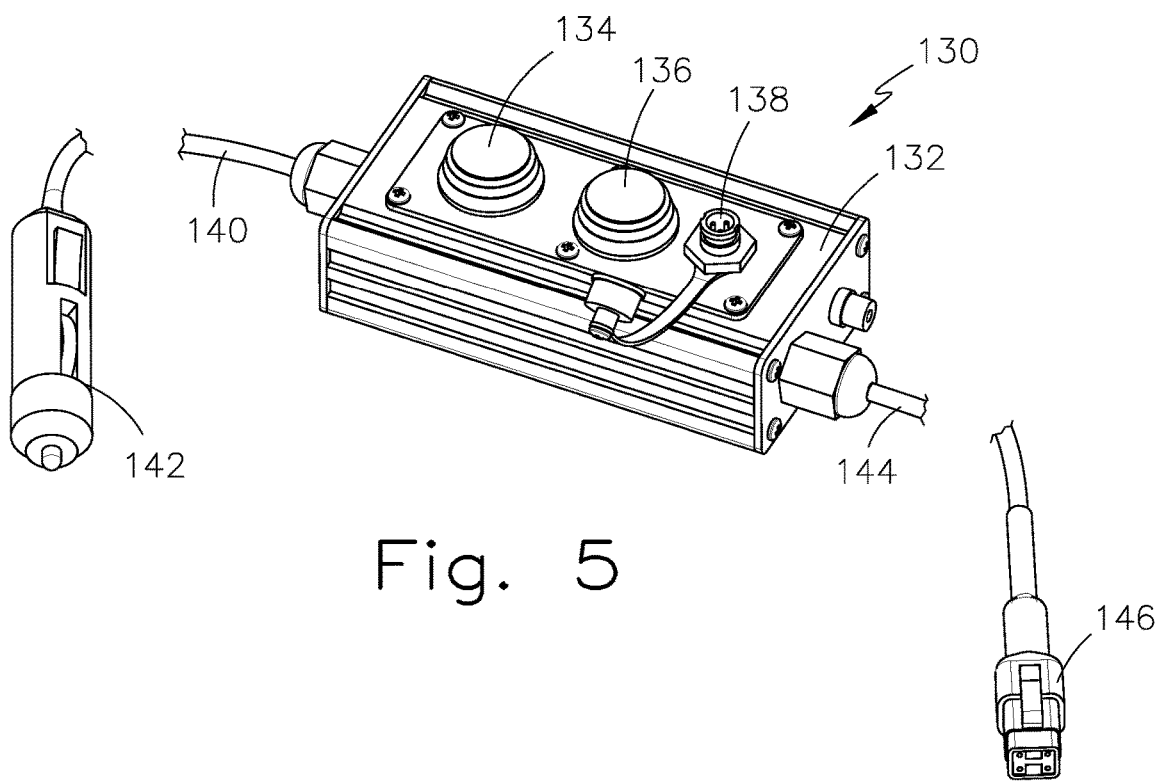

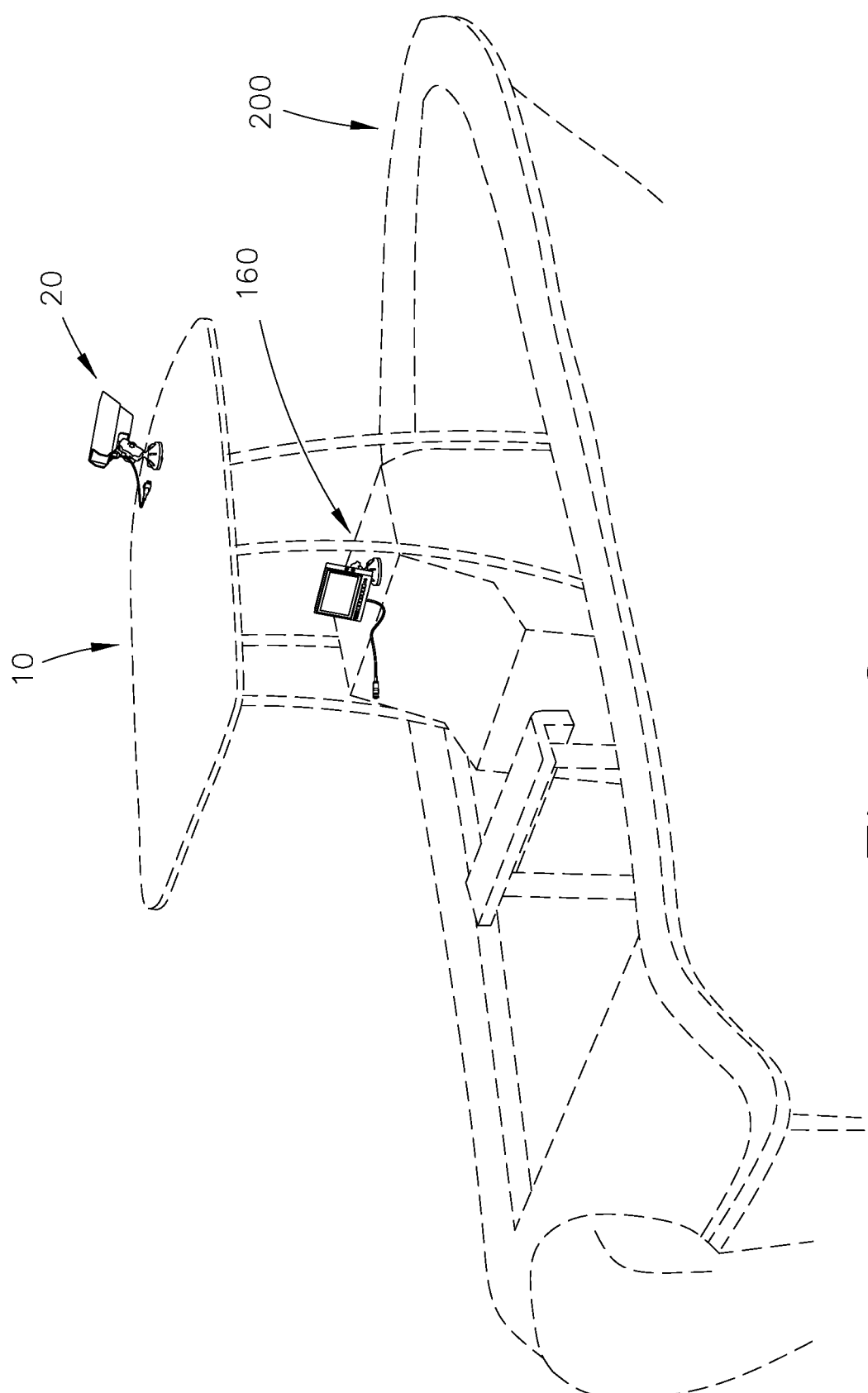

| Condition | 1 | Dusk, Dawn |
| Condition | 2 | Normally lit developed area, 1/2 moon |
| Condition | 3 | Normally lit developed area, no moon |
| Condition | 4 | Poorly lit undeveloped area, 1/4 moon |
| Condition | 5 | Poorly lit, undeveloped, overcast, 1/4 moon |
| Condition | 6 | Remote rural, no moon, heavy overcast |

Fig. 7

NIGHT VISION APPARATUS

BACKGROUND OF THE INVENTION

1. Field of the Invention

The present invention relates to night vision devices, and more particularly, to night vision apparatuses utilizing gas filled tubes and IR illuminator assemblies.

2. Description of the Related Art

Applicant believes that one of the closest references corresponds to U.S. Pat. No. 5,396,069 B issued to Craig, et al. on Mar. 7, 1995 for Portable monocular night vision apparatus. However, it differs from the present invention because Craig, et al. teach a monocular night vision apparatus employing an infrared energy spectrum source of illumination and a camera lens and night vision image intensifier combined receiver apparatus into a hand-held portable package. The night vision transmitter apparatus includes a laser diode energy source that is coupled to an aperture controlled and focus controlled optical system and driven by an electronic closed-loop feedback energization circuit, which employs self-contained battery sources of energy. Operating modes and intensities of the light source are provided through a plurality of signal inputs to the closed feedback loop of the laser diode energy source. Disturbance of the closed feedback loop by reflected energy within the optical transmitter apparatus is precluded by the use of feedback prevention optical alignment in the transmitter's optical system.

Applicant believes that another reference corresponds to U.S. Pat. No. 5,444,568 B issued to Williams, Jr., et al. on Aug. 22, 1995 for Consumer night vision viewing apparatus. However, it differs from the present invention because Williams, Jr., et al. teach a night vision goggle device fabricated for consumer use. The device employs interpupillary and diopter adjustments for each eye of the user. The combined adjustment mechanism incorporates manually operable control knobs located on the housing and one knob for each of the eye pieces. Each control knob is capable of moving both in a forward and rear mode and in a transverse mode. The knob can provide diopter focus adjustment for a front to back motion and for lateral movement or transverse movement the control provides for interpupillary adjustment. The movement of the knob and the removal of pressure or force from the knob enables the optical assemblies to be locked in position by a friction fit.

Applicant believes that another reference corresponds to U.S. Pat. No. 5,495,364 B issued to Gary L. Palmer on Feb. 27, 1996 for Night vision binoculars. However, it differs from the present invention because Palmer teaches a night vision binocular assembly capable of converting low light and infrared energy into a visible image. The night vision binocular assembly includes at least one objective lens assembly, image intensifier tube, collimator lens assembly and diopter cell assembly encased in an easy to assembly waterproof housing. The objective lens assembly, image intensifier tube, collimator lens assembly and diopter cell assembly are all supported by a common base structure within the housing. Variations caused by thermal expansions and contractions are evenly distributed among the various optical elements, thereby preserving a predetermined optical relationship between those elements. Simple button controls are used to operate and adjust the night vision binocular assembly. The button controls are disposed on a common circuit board. An elastomeric structure is disposed between the circuit board and the interior of the binocular housing. The circuit board is affixed to the interior of the binocular housing in a manner that compresses the elastomeric structure against the binocular housing, which is further sealed to the housing to provide a water tight seal. The elastomeric structure has switch membranes or domed portions which extend through apertures in the housing creating both a fluid impermeable seal with the housing and a means for the tactile engagement of the switches on the below lying circuit board.

Applicant believes that another reference corresponds to U.S. Pat. No. 5,729,016 B issued to Klapper, et al. on Mar. 17, 1998 for Low cost night vision for nonmilitary surface vehicles. However, it differs from the present invention because Klapper, et al. teach a low cost night vision system for use in connection with law enforcement vehicles, marine vessels, and other nonmilitary surface vehicles. It includes a night vision camera having an array of uncooled detectors. A mechanism is provided for adjusting the pointing angle of the night vision camera in response to scan control signals. Output signals from the uncooled detectors are further processed into a standard video format and displayed on a conventional display located, for example, within a vehicle or marine vessel.

Applicant believes that another reference corresponds to U.S. Pat. No. 5,737,131 B issued to Gary Lynn Palmer on Apr. 7, 1998 for Night vision monocular. However, it differs from the present invention because Palmer teaches a night vision monocular that includes an objective lens subassembly for receiving low intensity and/or infrared light. The objective lens subassembly focuses the light onto an image intensifier tube that converts the light into a visible image. The visible image passes through a collimator subassembly that collimates the visible image. Finally, the collimated image is viewed through an eyepiece subassembly. The objective lens subassembly, image intensifier tube, collimator subassembly and eyepiece subassembly are each separately manufactured subassemblies that are encased in sub-housings and are ready to be assembled into a larger optical device. The housing of the night vision monocular is a two-piece structure, having a first half and an opposite second half. Partitions extend inwardly from a plurality of locations on both halves of the housing. The partitions are contoured and positioned to abut against and retain the various subassemblies within the night vision device. At least two partitions from each half of the housing abut against and support the objective lens subassembly, the image intensifier tube, the collimator subassembly and the eyepiece subassembly. The partitions within the housing are the only elements of positioning and optically aligning the various subassemblies. Consequently, no adhesive or mechanical fasteners are needed to retain components within the housing. The housing itself need not be precision machined.

Applicant believes that another reference corresponds to U.S. Pat. No. 5,751,344 B issued to Robert Alan Schnee on May 12, 1998 for Navigation system for a marine vessel in low light conditions. However, it differs from the present invention because Schnee teaches an aid for marine navigation that includes a low-light video camera mounted within a weatherproof enclosure on a vantage point of a marine vessel for improved night vision. A conventional video camera is also mounted with the low-light video camera for daytime viewing. Video signals from the cameras are automatically selected depending on light conditions for transmission to a cabin of the vessel. Motors rotate the housing in a horizontal plane and in a vertical plane for enabling remote-controlled aiming of the cameras from the helm of the marine vessel. Sensors provide information on azimuth and elevation of the cameras for overlaying the video signal transmitted from the camera housing with this information for display with the video image on a monitor near the helm. Information on longitude and latitude, as well as vessel velocity and direction, from a global satellite positioning system receiver is also displayed. The overlayed video signal is RF modulated on to a predetermined channel for distribution to television receivers in other locations on the vessel.

Applicant believes that another reference corresponds to U.S. Pat. No. 5,763,882 B issued to Klapper, et al. on Jun. 9, 1998 for Low cost night vision camera. However, it differs from the present invention because Klapper, et al. teach a low cost infrared camera for night vision. The camera is disposed within a housing having an infrared transmissive window disposed at an input aperture thereof. A compact optical arrangement is disposed within the housing to focus energy from the window onto a focal plane array. A chopper disk is positioned between the reflective optical arrangement and the focal plane array to establish a reference level for the array and to facilitate a sequential readout thereof. A signal processing circuit is included for processing the output of the array for display on a standard video screen. Thus, the problems with uncooled detectors are overcome by use of a fast optical system in combination with an uncooled detector. The fast optical system provides a high signal level to the uncooled detector, thereby compensating for losses in collection of thermal radiation. Reflective optical systems can be manufactured inexpensively from plastic or aluminum and reduce the need for expensive infrared materials commonly used in military systems. The combination of the fast optics and uncooled detector provides a low cost thermal camera for night vision.

Applicant believes that another reference corresponds to U.S. Pat. No. 6,057,880 B issued to Robert Alan Schnee on May 2, 2000 for Navigation system for a marine vessel in low light conditions. However, it differs from the present invention because Schnee teaches an aid for marine navigation that includes a low-light video camera mounted within a weather-proof enclosure on a vantage point of a marine vessel for improved night vision. A conventional video camera is also mounted with the low-light video camera for daytime viewing. Video signals from the cameras are automatically selected depending on light conditions for transmission to a cabin of the vessel. Motors rotate the housing in a horizontal plane and in a vertical plane for enabling remote-controlled aiming of the cameras from the helm of the marine vessel. Sensors provide information on azimuth and elevation of the cameras for overlaying the video signal transmitted from the camera housing with this information for display with the video image on a monitor near the helm. Information on longitude and latitude, as well as vessel velocity and direction, from a global satellite positioning system receiver is also displayed. The overlayed video signal is RF modulated on to a predetermined channel for distribution to television receivers in other locations on the vessel.

Applicant believes that another reference corresponds to U.S. Pat. No. 7,581,852 B2 issued to Kennedy, et al. on Sep. 1, 2009 for Portable device for viewing and imaging. However, it differs from the present invention because Kennedy, et al. teach a portable searchlight with a focused beam operating both in the infrared and visible portions of the spectrum with a range of approximately 400 meters that includes telescopic lens system integrated with an illumination system. The beam of the searchlight and the telescopic lens are automatically aligned to both focus on a distant object. The telescopic lens system is combined with a digital camera system and an LCD display. The searchlight includes an eyepiece lens enabling a user to choose either viewing a display screen or using the eyepiece lens to optically observe the field of view.

Applicant believes that another reference corresponds to U.S. Pat. No. 8,076,633 B2 issued to Seiya Shimizu on Dec. 13, 2011 for Night vision apparatus. However, it differs from the present invention because Shimizu teaches a night vision image-processing unit that separates an input field image that a field-separating unit has acquired from a near-infrared camera into an odd-numbered field image and an even-numbered field image. A region segmenting unit segments an image into a plurality of regions based on luminance value of each pixel included in the odd-numbered field image and the even-numbered field image. A luminous region processing unit, a high-reflection region processing unit, and a low-luminance region processing unit correct the luminance value according to characteristics of the regions.

Applicant believes that another reference corresponds to U.S. Pat. No. 8,384,780 B1 issued to Frank, et al. on Feb. 26, 2013 for Infrared camera systems and methods for maritime applications. However, it differs from the present invention because Frank, et al. teach systems and methods of infrared camera for maritime applications. For example, a watercraft includes a plurality of image capture components coupled to the watercraft to capture infrared images around at least a substantial portion of a perimeter of the watercraft; a memory component adapted to store the captured infrared images; a processing component adapted to process the captured infrared images according to a man overboard mode of operation to provide processed infrared images and determine if a person falls from the watercraft; and a display component adapted to display the processed infrared images.

Applicant believes that another reference corresponds to U.S. Pat. No. 8,463,038 B2 issued to Sakai, et al. on Jun. 11, 2013 for image processing apparatus and method for correcting an image base upon features of the image. However, it differs from the present invention because Sakai, et al. teach an image processing apparatus includes a division unit configured to divide an image into a plurality of areas, a calculation unit configured to calculate a feature amount for each division area, an area category determination unit configured to determine for each division area at least a night scene category or an under-exposure category based on the calculated feature amount, an entire category determination unit configured to determine a category of the entire image based on the result of category determination, and a processing unit configured to perform correction processing on the image based on the result of category determination by the entire category determination unit.

Applicant believes that another reference corresponds to U.S. Pat. No. 8,502,913 B2 issued to Nakayama on Aug. 6, 2013 for video processing apparatus and video processing method. However, it differs from the present invention because Nakayama teaches an imaging apparatus includes a histogram shape determination unit that acquires a histogram of luminance values from video captured by an image-capturing unit and determines whether or not the captured video is a night scene from the shape of the histogram. The imaging apparatus also includes a point light source determination unit that acquires the maximum value of contrast for each horizontal line in the video as a line evaluation value and determines whether the captured video is a night scene based on whether or not the line evaluation value has a characteristic of an object as a point light source. If the histogram shape determination unit and the point light source determination unit determine that the captured video is a night scene, the imaging apparatus determines that the scene captured by the image-capturing unit is a night scene.

Applicant believes that another reference corresponds to U.S. Pat. No. 9,117,139 B2 issued to Nakayama on Aug. 15, 2015 for Video processing apparatus and video processing method. However, it differs from the present invention because Nakayama teaches an imaging apparatus includes a histogram shape determination unit that acquires a histogram of luminance values from video captured by an image-capturing unit and determines whether or not the captured video is a night scene from the shape of the histogram. The imaging apparatus also includes a point light source determination unit that acquires the maximum value of contrast for each horizontal line in the video as a line evaluation value and determines whether the captured video is a night scene based on whether or not the line evaluation value has a characteristic of an object as a point light source. If the histogram shape determination unit and the point light source determination unit determine that the captured video is a night scene, the imaging apparatus determines that the scene captured by the image-capturing unit is a night scene.

Applicant believes that another reference corresponds to U.S. Pat. No. 9,615,006 B2 issued to Terre, et al. on Apr. 4, 2017 for Infrared camera systems and methods for facilitating target position acquisition. However, it differs from the present invention because Terre, et al. teach infrared camera systems and related methods for facilitating target position acquisition. For example, a system may include a portable imaging/viewing subsystem having a target position finder and may also include a fixed mount camera subsystem having a camera and a camera positioner. A communications link may be configured to communicate a signal from the target position finder to the camera positioner. The signal may be representative of a position of a target being imaged/viewed with the portable imaging/viewing subsystem. The camera positioner may aim the camera toward the target in response to the signal. The target may be a man overboard.

Applicant believes that another reference corresponds to U.S. Pat. No. 9,729,802 B2 issued to Frank, et al. on Aug. 8, 2017 for Infrared camera systems and methods for maritime applications. However, it differs from the present invention because Frank, et al. teach systems and methods for infrared cameras for maritime applications. For example, a watercraft includes a plurality of image capture components coupled to the watercraft to capture infrared images around at least a substantial portion of a perimeter of the watercraft; a memory component adapted to store the captured infrared images; a processing component adapted to process the captured infrared images according to a man overboard mode of operation to provide processed infrared images and determine if a person falls from the watercraft; and a display component adapted to display the processed infrared images.

Applicant believes that another reference corresponds to U.S. Patent Application Publication No. 2002/0184640 A1, published on Dec. 5, 2002 to Robert Alan, et al. for Remote controlled marine observation system. However, it differs from the present invention because Robert Alan, et al. teach an observational apparatus, which has a remote controlled housing that can be controlled proximate the housing or from various points around the world via a global communications network. A camera cluster mounted to the remote controlled housing has a signal output. A monitor to receive the signal output can be located proximate the remote controlled housing or distant from the remote controlled housing.

Applicant believes that another reference corresponds to CN Patent No. 201619679 U issued to Zhou, et al. on Nov. 3, 2010 for marine photoelectric tracking monitoring device with laser dazzling function. However, it differs from the present invention because Zhou, et al. teach a marine photoelectric tracking monitoring device with a laser dazzling function, which comprises a direction seat, a U-shaped support and a spherical pitching bag, wherein the direction seat is connected with a ship top deck. The marine photoelectric tracking monitoring device is characterized in that a television camera, an infrared thermal imager, a laser dazzler and a gyroscope are installed inside the spherical pitching bag; the optical axis directions of optical lenses of the television camera, the infrared thermal imager and the laser dazzler are the same and correspond to a perspective window arranged on the airtight pitching bag; and the direction seat, a servo motor inside the pitching bag and the gyroscope are used for stabilization control. The marine photoelectric tracking monitoring device not only has the functions of all-dimensional all-weather 24-hour remote image observation, automatic target tracking and monitoring, but also can transmit dazzling laser beams according to the requirement of maritime self-defense, and is particularly suitable for being installed on an ocean-going merchant ship and an official law enforcement ship.

Other patents describing the closest subject matter provide for a number of more or less complicated features that fail to solve the problem in an efficient and economical way. None of these patents suggest the novel features of the present invention.

SUMMARY OF THE INVENTION

The present invention is a night vision apparatus, comprising a camera assembly with a camera housing having a charge-coupled device image sensor, an infrared illuminator assembly, and a first base assembly. The present invention further comprises a switch assembly and a display assembly.

The camera housing comprises a top face, a bottom face, a front face, a lens, and an adaptor. The lens has a focal length of approximately 25 mm or 50 mm.

The infrared illuminator assembly comprises a housing, an infrared illuminator lens, an infrared illuminator, and a supporting structure. The infrared illuminator is an approximately 2.5 watt illuminator that produces an approximately 10° main beam pattern. The infrared illuminator assembly is attached to the camera housing.

The first base assembly comprises an upper clamp wall, a lower clamp wall, a screw handle, a base, a base supporting structure, and a suction cup. The suction cup secures the camera assembly onto a surface.

The switch assembly comprises a switch housing having a switch, an infrared illuminator switch, and a switch housing connector. The switch assembly is electrically connected to a battery assembly.

The display assembly comprises a frame, a display, and control buttons. The display assembly is secured by a second base assembly. The display receives and shows images captured by the camera assembly.

The camera assembly is electrically connected to the switch assembly with a camera cable. The display assembly is electrically connected to the switch assembly. The switch assembly activates the camera assembly. The infrared illuminator switch activates the infrared illuminator.

The camera assembly operates at a wavelength approximately between 400 to 1200 nm allowing vision in low light and dark environments. The camera assembly captures high-resolution images in low light and dark environments.

The present invention may be mounted onto any watercraft or vehicle.

It is therefore one of the main objects of the present invention to provide a night vision apparatus.

It is another object of this invention to provide a night vision apparatus that allows seeing in conditions of absolute darkness.

It is another object of this invention to provide a night vision apparatus having a hands free operation.

It is another object of this invention to provide a night vision apparatus that is portable for use on any vehicle including ATVs, marine vessels, and watercraft of all sizes.

It is another object of this invention to provide a night vision apparatus, which has a high resolution.

It is another object of this invention to provide a night vision apparatus that is volumetrically efficient for carrying, transporting, and storage.

It is another object of this invention to provide a night vision apparatus that can be readily assembled and disassembled without the need of any special tools.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 is an isometric view of the display assembly mounted onto a base assembly.

FIG. 5 is an isometric view of the switch assembly.

FIG. 6 is an isometric view of the present invention mounted in a boat.

FIG. 7 is a Table showing inland darkness scale factors.

DETAILED DESCRIPTION OF THE PREFERRED EMBODIMENT

Figure 1:
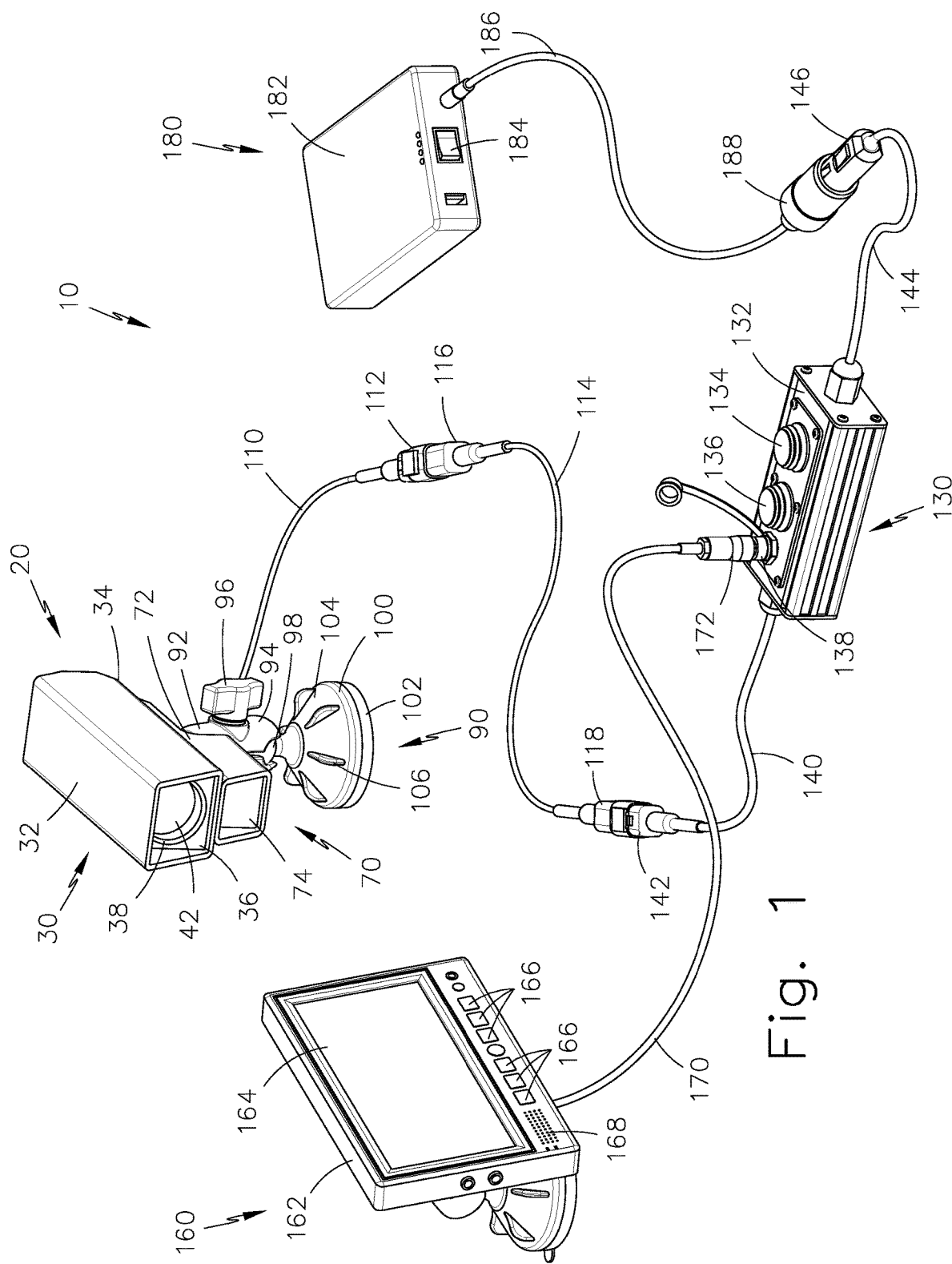
FIG. 1 is an isometric view of the present invention.

Referring now to the drawings, the present invention is a night vision apparatus, and is generally referred to with numeral 10. It can be observed that it basically includes camera assembly 20, switch assembly 130, and display assembly 160.

As seen in FIG. 1, camera assembly 20 comprises camera housing 30, infrared illuminator assembly 70, and base assembly 90. In a preferred embodiment, camera assembly 20 operates at a wavelength of approximately between 400 to 1200 nm allowing for visibility while viewing display assembly 160 in low light and dark environments, such as during no light, low light, and/or minimal light nighttime conditions. Camera assembly 20 captures high-resolution images in low light and/or dark environments, such as during no light, low light, and/or minimal light nighttime conditions.

Figure 2:
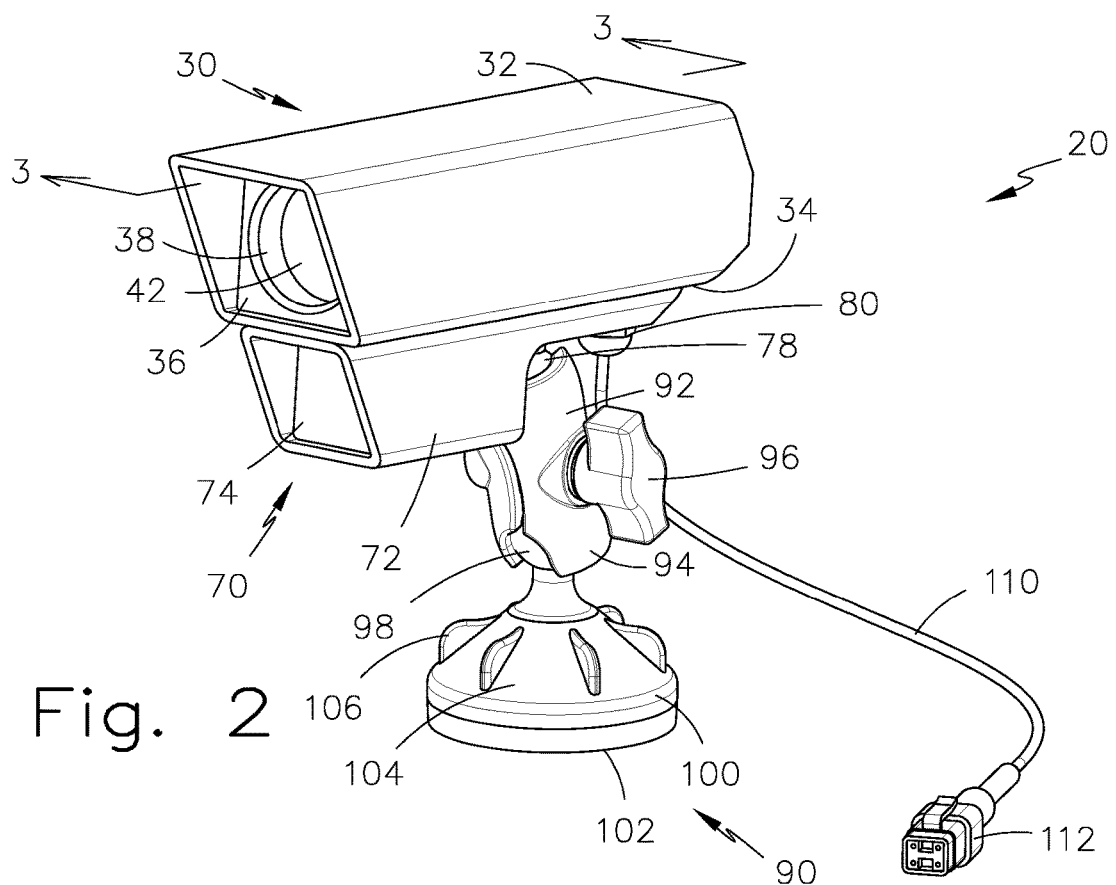
FIG. 2 is an isometric view of a camera assembly of the present invention.

Camera assembly 20 and display assembly 160 are both electrically connected to switch assembly 130. Infrared illuminator assembly 70 has connection 80, as seen in FIG. 2, from which extends camera cable 110 having camera connector 112. Camera connector 112 connects with extension cable 114 through extension connector 116. Extension cable 114 further comprises extension connector 118, which connects with connector 142 of switch cable 140. Display assembly 160 comprises display cable 170. Display cable 170 comprises display connector 172, which connects to switch housing connector 138.

Battery assembly 180 is also electrically connected to switch assembly 130. Battery assembly 180 comprises battery housing 182, battery switch 184, which is an on/off switch, and at least one battery, not seen. Battery cable 186 extends from battery housing 182 and connects to battery connector 188, which connects with connector 146 at an end of switch cable 144. Battery assembly 180 provides power/energy required for operation of present invention 10.

As seen in FIG. 2, camera housing 30 comprises top face 32, bottom face 34, and front face 36 having aperture 38. Aperture 38 aligns with lens 42.

Figure 3:
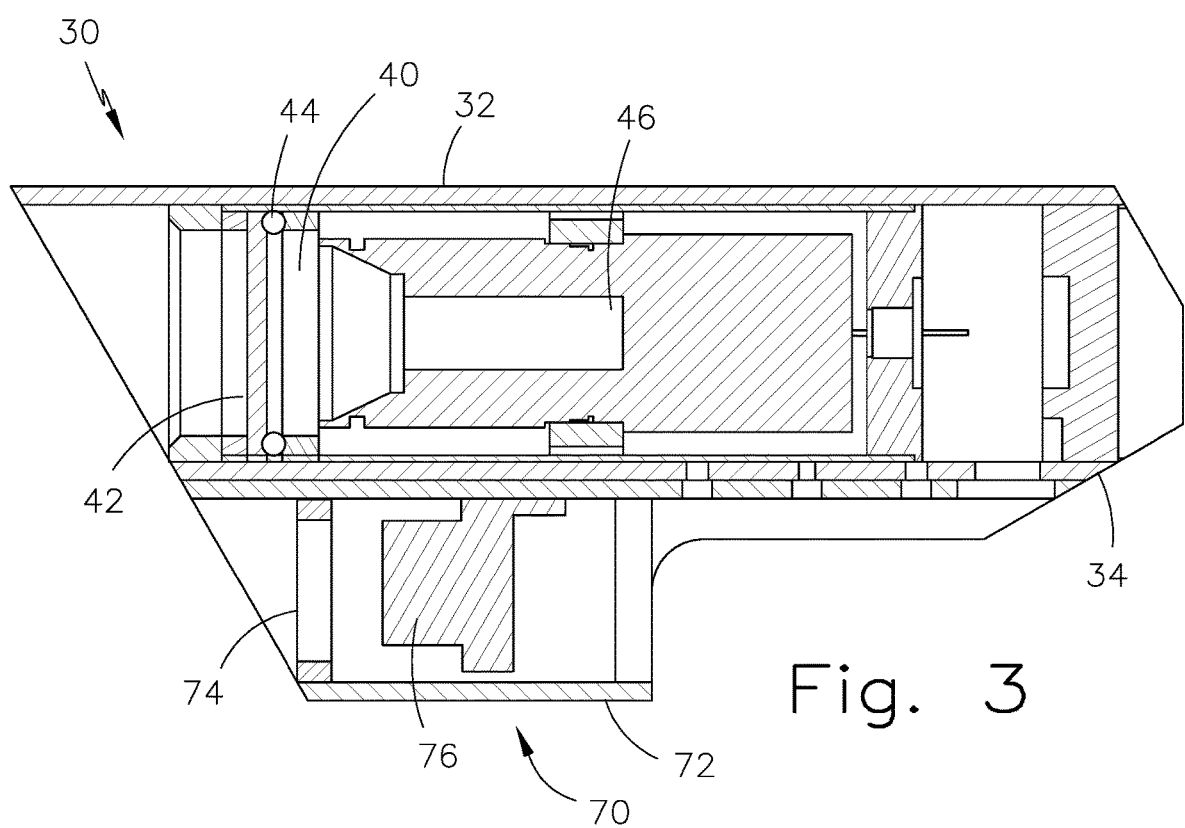
FIG. 3 is a cut view taken along the lines 3-3 as seen in FIG. 2.

Infrared illuminator assembly 70 comprises housing 72, which houses infrared illuminator lens 74 and infrared illuminator 76, as seen in FIG. 3. Infrared illuminator assembly 70 is attached to bottom face 34 of camera housing 30. Supporting structure 78 and connection 80 extend from housing 72.

Base assembly 90 comprises upper clamp wall 92, lower clamp wall 94, screw handle 96, base supporting structure 98, base 100, and suction cup 102. Upper clamp wall 92 holds supporting structure 78, and lower clamp wall 94 holds base supporting structure 98, securing camera housing 30 and infrared illuminator assembly 70 onto base assembly 90. Screw handle 96 secures upper clamp wall 92 and lower clamp wall 94 onto respective supporting structure 78 and base supporting structure 98.

Base assembly 90 further comprises base lateral wall 104 that extends from base protrusion structure 98 to base 100. Base lateral wall 104 comprises protrusions 106 to grasp and rotate base 100 for mounting and removing suction cup 102 from a surface. Suction cup 102 secures camera assembly 20 onto a surface, whereby base lateral wall 104 rotates onto base 100 while a vacuum forms between suction cup 102 and the surface to mount thereon.

As seen in FIG. 3, camera housing 30 further comprises charge-coupled device (CCD) image sensor 40, lens 42, adaptor 44, and tube 46.

CCD image sensor 40 is a highly sensitive photon detector. CCD image sensor 40 is divided up into a large number of light-sensitive small areas, known as pixels, which can be used to build up an image. A photon of light, which falls within an area defined by one of the pixels, converts into one or more electrons, and the number of electrons collected will be directly proportional to the intensity of the scene at each pixel. CCD image sensor 40 is highly sensitive to a wide spectrum of light, approximately from 400 nm to near infrared light (800 to 1200 nm). As this wavelength is "invisible" to the human eye yet readily detected by CCD image sensor 40, images can be produced even in low light.

In CCD image sensor 40, pixels are represented by p-doped MOS (Metal-Oxide-Semiconductor) capacitors on a silicon semiconductor substrate. These capacitors are biased above the threshold for inversion when image acquisition begins, allowing the conversion of incoming photons into electron charges at the semiconductor-oxide interface, and CCD image sensor 40 is then used to read out these charges. In order to more efficiently process low intensity light levels, CCD image sensor 40 used in present invention 10 has coupled a low light specific chip set with leading edge shutter control firmware, not shown. This basically allows CCD image sensor 40 to dynamically increase or decrease register shifting and charge dump times on each capacitor (pixel). There are just under ½ million pixels/capacitors on each CCD image sensor 40. More specifically, CCD image sensor 40 takes an incoming photon of light and photo reactively convert it to an electric charge value through a photo diode to an individual capacitor and discharges each capacitor through a digital register that is time based. The register output is then processed into a streaming image. Each micro-sized capacitor represents a pixel.

Lens 42 has a focal length of approximately 25 mm or 50 mm. In a preferred embodiment, lens 42 has a focal length of approximately 25 mm and an F-stop of approximately 1.4. For off-road application, lens 42 will be either 25 mm or 50 mm with an F-stop 1.4. F-stops are aperture setting of lens 42. As a basic rule, the wider the aperture, the more light is collected. The F values are numerically inverse, meaning that an F stop of 1.4 is twice as wide as a 2.8. The wider the F stop can be for present invention 10, the more light lens 42 will collect, which in low light/dark conditions is good. In a preferred embodiment, lens 42 is a high definition 25 mm F1.4 C-mount lens. Lens 42 generally focuses on distant objects. Lens 42 has lock down screws, not seen, to maintain focus and aperture settings. Adaptor 44 is a C to CS adaptor. In a preferred embodiment, adaptor 44 is a chrome ring and is positioned between CCD image sensor 40 and lens 42. In a preferred embodiment, tube 46 is 5-PSI Nitrogen ($N_2$) filled.

CCD image sensor 40 is sensitive to near infrared (IR) light (750 nm to 1000+nm). Therefore, CCD image sensor 40 benefits from external IR light sources. Infrared (IR) illuminator assembly 70 is small, measuring approximately 3" long and 1.75" wide. IR illuminator assembly 70 comprises infrared (IR) illuminator 76. In a preferred embodiment, IR illuminator 76 emits light at a wavelength of approximately 840 nm. According to present invention 10, a spectral response of CCD image sensor 40 to an 840 nm external light source is about 70%.

In a preferred embodiment, IR illuminator 76 is an approximately 2.5 watt illuminator that produces approximately a 10° main beam pattern. This is a nominal beam pattern with sufficient illumination to allow detection of small objects, as a paper cup, at over 100 yards and larger objects, as bridges and structures, at over 1 mile.

Infrared illumination is only necessary in extremely dark areas, usually with little or no moonlight and/or heavy overcast conditions. In so far as putting a scale factor on darkness, while subjective, the below graphic illustrates most conditions that will be encountered using present invention 10.

According to FIG. 7, IR illuminator 76 would only be required in conditions 5 and 6. In operation, present invention 10 collects as much light as possible to produce an optimum image. This is evident when using present invention 10 on a full moon night as opposed to the little or no moonlight and/or heavy overcast conditions.

As seen in FIG. 4, display assembly 160 comprises frame 162, display 164, control buttons 166, and holes 168 for a speaker, not seen, within frame 162. A second base assembly 90 secures display assembly 160. Display 164 receives and shows images captured by camera assembly 20.

As seen in FIG. 5, switch assembly 130 comprises switch housing 132 having infrared (IR) illuminator switch 134, switch 136, which is an on/off switch for display assembly 160, and switch housing connector 138. Switch assembly 130 activates camera assembly 20, and IR illuminator switch 134 activates IR illuminator assembly 70, seen in FIG. 1.

As seen in FIG. 6, present invention 10 may be mounted onto watercraft 200. Watercraft 200 may be a ship, boat, yacht, houseboat, sailboat, or any other marine vessel. Present invention 10 may also be mounted onto any vehicle, such as but not limited to, an automobile, truck, recreational vehicle, motorcycle, three-wheeler, or four wheeler including all-terrain vehicles. Present invention 10 allows users to see channel markers, bridge pylons, debris, and anything else that might be a threat to watercraft 200 or a vehicle. Thus, providing the users a level of situational awareness previously unavailable. Many recreational activities that were once awkward at night, such as boating and hunting, are increasingly integrating present invention 10.

In an alternate embodiment, present invention 10 may draw power/energy from watercraft 200 and not battery assembly 180, whereby connector 146 plugs into an outlet of watercraft 200, not seen.

Night vision is defined by two basic components, the ability of spectral sensitivity and the intensity of the wavelengths. Spectral sensitivity is an animal's ability or a sensor's ability to detect specific wavelengths of light. Wavelengths of light are measured in Nanometers (nm). One nanometer is one billionth of a meter. Visible light to humans falls within 400 nm to about 770 nm. In 430 nm appears violet (UV) to a human being and 770 nm appears deep red. Intensity of the wavelength is essentially determined by the amplitude of each wavelength, which is defined in many different terms and units of measurement. Basically, the higher the amplitude, the brighter the wavelength (light).

Present invention 10 is designed for operational parameters in low light/night time environments, and to provide a realistic depth perception of distant objects due to lens 42 and sensor settings. Present invention 10 provides users with a more navigable system as opposed to wider view systems. Even in very dark conditions, present invention 10 gives the operator a realistic field of view and hence, frame of visual reference. CCD image sensor 40 has low light sensitivity that works well in conjunction with IR illuminator 76, to perform in zero light environments. CCD image sensor 40 also allows present invention 10 to provide a very standard 60 Hz video output and thus can be viewed on display 164, as seen in FIG. 4. CCD image sensor 40 also lends itself well to optional upgrades such as wireless video transmission, video recording, portable versions and more.

In a preferred embodiment, present invention 10 has the following specifications:

Sensor
Type: CCD
Peak spectral response: Approx. 650 Nanometers (nm)
Minimum illumination: 0.00005 Lux
Pixels: 752 9(V)×582(H)
Lens Type: C-Mount F1.4 25 mm
Field of View: 14°
Interchangeable lenses: Yes, C or CS Mount
Iris: Fixed
System
Power: 12 VDC<200 milli-amps
Housing: Anodized Aluminum/powder coated
Weight: <2 Lbs.

Sensor Dimensions: 5.75" L×2" H×2.5" W

Switch Panel Functions: On/Off Illuminated. Pre-wired for Optional IR Illum. Modules, 4 pin twist lock for monitor, Aux. RCA video out Operating Temp.: 10° F. to 120° F.

Cable Length: 20 ft/Custom lengths available

Cable Jacket: TPE/Rubber, shielded video

Present invention 10 has the following advantages:

allows to see in absolute darkness;

allows to see in twilight;

hands free operation;

allow to read lettering;

provides video output;

allow to see through glass;

high Resolution;

video FPS of about 60 Hz.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A portable night vision apparatus, the portable night vision apparatus comprising:
    a camera assembly comprising a camera housing having a charge-coupled device image sensor within the camera housing, an aperture in the camera housing, and a camera lens coupled with the camera housing and aligned with the aperture;
    an infrared illuminator assembly comprising a housing, an infrared illuminator within the housing, and an infrared illuminator lens coupled with the housing, wherein the infrared illuminator assembly is attached to the camera housing; and
    a base assembly attached to the camera assembly and the infrared assembly, the base assembly configured for mounting the camera assembly and the infrared illuminator assembly onto a watercraft, wherein the camera assembly and the infrared illuminator assembly are movable relative to the base assembly;
    wherein the infrared illuminator is configured to be positioned on the watercraft above a water surface in an environment to provide illumination to the environment above the water surface during navigation through the environment, wherein the camera assembly is configured to be positioned on the watercraft above the water surface in the environment to capture images of the environment above the water surface during navigation through the environment, and wherein a beam pattern of the infrared illuminator assembly is sufficient to allow the camera assembly to capture images of the environment within a field of view of the camera assembly at a distance of at least 100 yards from the watercraft for navigation through the environment.

2. The night vision apparatus set forth in claim 1, further characterized in that said camera housing comprises a top face, a bottom face, a front face, wherein an adaptor is positioned within the camera housing between the lens and the charge-coupled device image sensor.

3. The night vision apparatus set forth in claim 1, further characterized in that said lens has a focal length of approximately 25 mm or 50 mm.

4. The night vision apparatus set forth in claim 1, further characterized in that said infrared illuminator is an approximately 2.5 watt illuminator that produces an approximately 10° main beam pattern.

5. The night vision apparatus set forth in claim 1, wherein the base assembly comprises an upper clamp wall, a lower clamp wall, a screw handle, a base, a base supporting structure coupled with the base, and a suction cup coupled with the base, wherein the upper and lower clamp walls are clamped onto the base supporting structure and onto a supporting structure of the camera assembly such that the base supporting structure and the supporting structure are positioned between the upper and lower clamp walls, wherein the screw handle secures the upper and lower clamp walls about the base supporting structure and the supporting structure, and wherein the suction cup is configured to secure the camera assembly to a surface of the watercraft.

6. The night vision apparatus set forth in claim 1, further characterized in that said camera assembly operates at a wavelength approximately between 400 to 1200 nm so that the camera assembly captures images of the environment above the water during navigation through the environment when the environment above the water is a low light or dark environment.

7. The night vision apparatus set forth in claim 1, further characterized in that said camera assembly captures high resolution images of the environment above the water during navigation through the environment when the environment above the water is a low light or dark environment.

8. The night vision apparatus set forth in claim 1, further characterized in that the camera assembly is mounted onto the watercraft a position above the water surface.

9. The night vision apparatus set forth in claim 1, further comprising
    a display assembly, the display assembly comprising a display; and
    a switch assembly;
    wherein the display assembly and the camera assembly are in communication through the switch assembly, and wherein the display receives and displays images captured by said camera assembly.

10. The night vision apparatus set forth in claim 9, further characterized in that said switch assembly is electrically connected to a battery assembly.

11. The night vision apparatus set forth in claim 9, further characterized in that said switch assembly activates said camera assembly.

12. The night vision apparatus set forth in claim 9, further characterized in that said switch assembly comprises an infrared illuminator switch that activates said infrared illuminator.

13. The night vision apparatus set forth in claim 1, wherein the base assembly comprises a clamp, a base, and a base supporting structure coupled with the base, wherein the clamp is clamped onto the base supporting structure and onto a supporting structure of the camera assembly, and wherein the base is configured to secure the camera assembly to an above water surface.

14. The night vision apparatus set forth in claim 1, wherein the beam pattern of the infrared illuminator assembly is sufficient to allow the camera assembly to capture images of the environment at a distance of at least 1 mile from the watercraft.

15. The night vision apparatus as set forth in claim 1, wherein the infrared illuminator lens is aligned with the camera lens, and wherein the beam pattern emitted from the infrared illuminator lens is aligned with the field of view of the camera assembly.

16. A system equipped with night vision, the system comprising:
a watercraft;
a camera assembly comprising a camera housing having a charge-coupled device image sensor within the camera housing, an aperture in the camera housing, and a camera lens coupled with the camera housing and aligned with the aperture;
an infrared illuminator assembly comprising a housing, an infrared illuminator within the housing, and an infrared illuminator lens coupled with the housing, wherein the infrared illuminator assembly is attached to the camera housing;
a base assembly attached to the camera assembly and the infrared illuminator assembly and mounted onto the watercraft, wherein the camera assembly and the infrared illuminator assembly are movable relative to the base assembly;
a display assembly in communication with the camera assembly, the display assembly comprising a display;
wherein the infrared illuminator is mounted on the watercraft above a water surface in a marine environment at a position on the watercraft to provide illumination to the marine environment above the water surface during navigation of the watercraft through the marine environment;
wherein the camera assembly is mounted on the watercraft above the water surface in the marine environment and at a position on the watercraft to capture images of the marine environment above the water surface during navigation of the watercraft through the marine environment above the water surface; and
wherein a beam pattern of the infrared illuminator assembly is sufficient to allow the camera assembly to capture images of the marine environment within a field of view of the camera assembly at a distance of at least 100 yards from the watercraft for navigation through the marine environment and wherein the display is mounted on the watercraft and configured to receive and display images captured by said camera assembly during navigation of the watercraft through the marine environment.

17. The system of claim 16, wherein the display assembly and camera assembly are in communication through a switch assembly.

18. The system of claim 16, wherein the camera assembly operates at a wavelength approximately between 400 to 1200 nm and captures high resolution images of the marine environment above the water during navigation of the watercraft through the marine environment when the marine environment above the water is a low light or dark environment.

19. The system of claim 16, wherein the watercraft is a ship, yacht, houseboat, sailboat, or another boat.

20. A method of providing night vision on a watercraft, the method comprising:
providing an apparatus including a base assembly attached to a camera assembly and an infrared illuminator assembly, wherein the camera assembly and the infrared illuminator assembly are movable relative to the base assembly;
mounting the base assembly to a watercraft at a position on the watercraft such that the camera assembly and the infrared illuminator assembly are positioned above a water surface in a marine environment, wherein the camera assembly comprises a camera housing having a charge-coupled device image sensor within the camera housing, an aperture in the camera housing, and a camera lens coupled with the camera housing and aligned with the aperture; and wherein the infrared illuminator assembly comprises a housing, an infrared illuminator within the housing, and an infrared illuminator lens coupled with the housing, wherein the infrared illuminator assembly is attached to the camera housing;
providing communication between the camera assembly and a display assembly that is mounted on the watercraft, wherein the display assembly comprises a display;
illuminating a marine environment surrounding the watercraft and above a water surface with a beam pattern emitted by the infrared illuminator during navigation of the watercraft through the marine environment;
capturing images of the marine environment above the water surface within a field of view of the camera assembly during navigation of the watercraft through the marine environment, wherein the beam pattern of the infrared illuminator assembly is sufficient to allow the camera assembly to capture images of the environment within the field of view of the camera assembly at a distance of at least 100 yards from the watercraft; and
receiving the captured images from the camera assembly with the display assembly, and displaying the captured images on the display during navigation of the watercraft through the marine environment.

* * * * *